Figure 1:
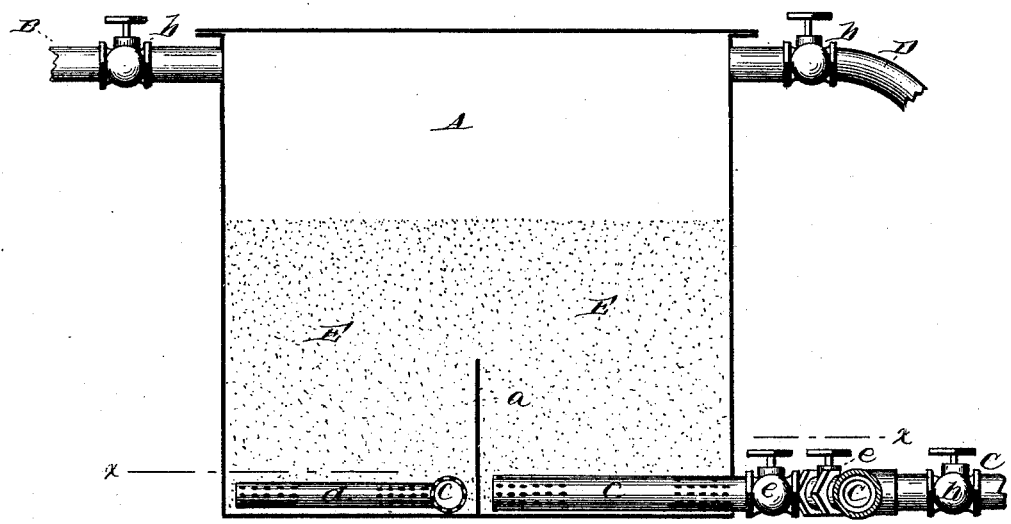

(No Model.)

W. M. DEUTSCH.
FILTER.

No. 476,737. Patented June 7, 1892.

Witnesses:
J. J. Kennedy
C. J. Sawyer

Inventor:
William M. Deutsch
by Philipp, Munson & Phelps
Attys

UNITED STATES PATENT OFFICE.

WILLIAM M. DEUTSCH, OF ELIZABETH, ASSIGNOR, BY MESNE ASSIGNMENTS, TO THE NEW YORK FILTER COMPANY, OF NEWARK, NEW JERSEY.

FILTER.

SPECIFICATION forming part of Letters Patent No. 476,737, dated June 7, 1892.

Application filed September 4, 1886. Serial No. 212,660. (No model.)

*To all whom it may concern:*

Be it known that I, WILLIAM M. DEUTSCH, a citizen of the United States, residing at Elizabeth, county of Union, and State of New Jersey, have invented certain new and useful Improvements in Filters, fully described and represented in the following specification and the accompanying drawings, forming a part of the same.

This invention relates to that general class of filters in which the purifying or cleansing of the water is accomplished by causing the water to percolate through a body of granular material, and particularly to a filter of this class which is designed for filtering water in large quantities, as for supplying cities and factories. In using filters of this class, particularly where the water filtered contains a considerable quantity of impurities, it is of course necessary from time to time to cleanse the filtering-bed, as otherwise the continued accumulation of the impurities in the bed would prevent the passage of the water through the bed, and thus render the filter inoperative. The cleansing of the bed in filters of this class has commonly been accomplished by forcing the water through the filter in the reverse direction, so that the impurities lodged in the bed during the filtering operation were carried upward out of the bed by the reverse current and conveyed away through the waste-pipe. In using filters of this character it is found in practice that the granular material of the bed during the filtering operation, particularly if that operation is continued for some time, becomes very tightly packed, so that when the water is sent in the reverse direction through the bed for the purpose of washing it considerable pressure is required to force the water up through the bed and loosen the granular material of the bed sufficiently to permit the impurities to be carried out of it. From this it results that the water when forced upward through the bed for the purpose of washing it, instead of being distributed over the whole area of the bed and passing upward through all portions of it alike, will find its way upward through any part of the bed which happens to be less tightly packed than the other parts, and, having loosened the material of that part of the bed, will continue to flow upward through that part of the bed, leaving the other parts unwashed.

It is the object of the present invention to overcome this difficulty and to provide means by which when it is desired to wash the bed the washing-water may be forced upward through all parts of the bed, so as to loosen the material of the whole bed and effect an even washing. This result is accomplished by dividing the bottom of the filter into a number of compartments by means of partitions arranged vertically therein and arranging the discharge-pipe so as to communicate with each of said compartments separately, so that the washing-water admitted under any portion of the bed will be compelled to pass upwardly through that portion of the bed and be prevented from spreading laterally.

Figure 2:
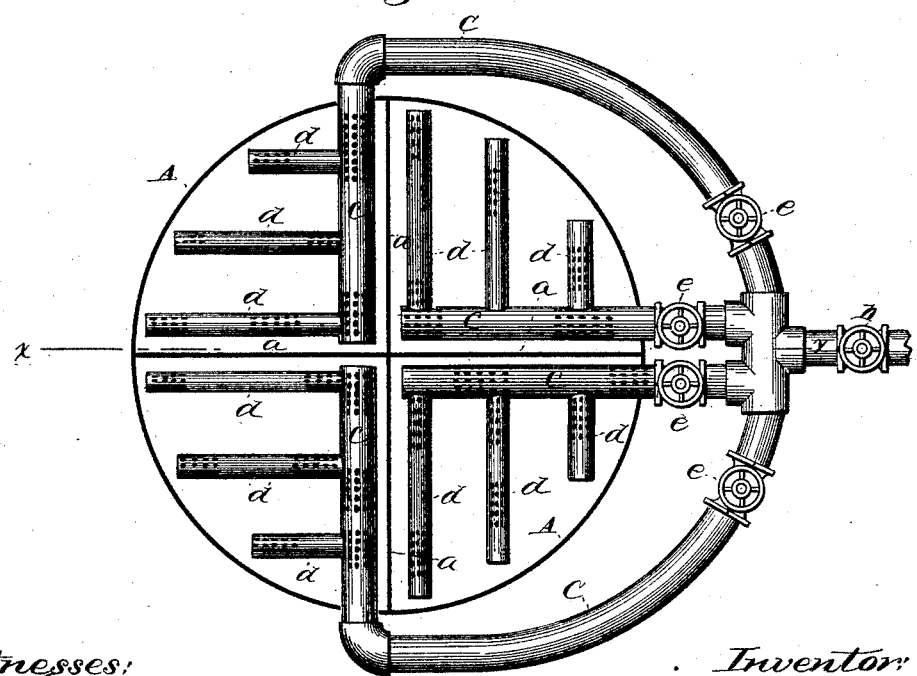

In the accompanying drawings, Figure 1 is a sectional elevation, taken upon the line $x\ x$ of Fig. 2, of a filter embodying the improvements of the present invention; and Fig. 2 is a horizontal section of the same, taken upon the line $x\ x$ of Fig. 1.

Referring to said figures, it is to be understood that the body A of the filter, or what may be termed the "filter proper," is of any of the usual forms. As herein shown, it is of cylindrical form and of a height about equal to its diameter; but it may be of any other form or other proportions to suit the location in which it is to be used. As herein shown, also, the filter is closed at its top, as will be the case when it is located below the level of the source from which the water is supplied. If the top of the filter is located above the level of the source from which the water is supplied, it may of course be open. The filter is provided near its top with the usual induction-pipe B, through which the water enters the filter, and at its bottom with the usual discharge-pipe C, through which the water passes after being filtered. The filter is also provided near its top with the usual waste-pipe D, through which the water flows out of the filter when the bed is being washed. The filter is provided with the usual filtering-bed E, formed of any suitable granular material, which extends upward about two-thirds of the height of the filter, more or less. The filter is provided at its bottom with two vertical partitions $a$, which extend about one-half of its height, more or less, and thus divide the bottom portion of the filter into four compartments. The discharge-pipe C is provided with four branches $c$, which enter the filter at its bottom and lie horizontally along the bottoms of the compartments, extending to points near the center of the filter, and these branches are provided with a number of lateral branches $d$, which also extend horizontally along the bottoms of the compartments. The branches $d$ and the portions of the branches $c$ which are inside the filter are perforated in the usual manner to permit the water after passing through the bed to enter them and flow outward through the discharge-pipe C. The pipes B D C are provided with the usual cocks or valves $b$ for controlling these pipes, and the branches $c$ are each provided with a cock or valve $e$, by which the water during the washing operation can be shut off from any one or more of these pipes, so as to confine the full pressure of the washing-water to any one or more of the compartments in the bottom of the filter.

The operation of the filter when thus constructed is as follows: During the filtering operation the valve $b$ of the pipe D will be closed and the valves $b$ of the pipes B C and also all of the valves $e$ will be opened. When it becomes necessary to wash the bed E, the valve $b$ of the pipe D will be opened and the valve $b$ of the pipe B closed. The water will then be sent in the reverse direction through the pipe C, and, passing inward through the branches $c$, will issue through the perforations in these branches and the branches $d$ and pass upward through the bed E, thereby loosening the material of the bed and carrying upward out of the bed the impurities that are lodged therein, which impurities will then be floated out through the waste-pipe D. If the bed should during the filtering operation become so packed that the pressure of the washing-water when distributed over the whole area of the bed is not sufficient to loosen the material of the bed or if one portion of the bed should be less tightly packed than the other portions, so that the washing-water, instead of finding its way upward through all parts of the bed, should all pass upward through one portion, the valves $e$ will be operated so as to send all of the washing-water through one of the branches $c$, and thus concentrate the whole pressure under one portion of the bed until that portion is loosened, and this will be repeated by operating the valves $e$ until all the portions of the bed have been loosened and washed. The partitions $a$ will during this washing operation confine the water to the particular part of the bed under which it is admitted and prevent it from spreading laterally. After the bed has thus been washed the valve $b$ of the pipe D will be closed and the valve $b$ of the pipe B opened and the filtering proceeded with. It is to be understood that the partitions may be so arranged as to divide the bottom portion of the filter into a greater or less number of compartments than shown without departing from the invention, and also that the arrangement of the discharge-pipe C may be different from that shown without departing from the invention, so long as this pipe is so arranged that the full pressure of the washing-water may be confined to one compartment to the exclusion of the other compartment or compartments.

What I claim is—

The combination, with a filter having its bottom portion divided into a number of compartments, of the discharge-pipe arranged to communicate with each compartment separately, substantially as described.

In testimony whereof I have hereunto set my hand in the presence of two subscribing witnesses.

WILLIAM M. DEUTSCH.

Witnesses:
GEO. H. GRAHAM,
JAS. J. KENNEDY.